(12) United States Patent
Beaudoin

(10) Patent No.: US 8,596,101 B2
(45) Date of Patent: Dec. 3, 2013

(54) VEHICLE FUEL THEFT PREVENTION ASSEMBLY

(75) Inventor: Michel Beaudoin, Bonsecours (CA)

(73) Assignee: Les Aciers Robond Inc., Magog, Quebec (CA)

( * ) Notice: Subject to any disclaimer, the term of this patent is extended or adjusted under 35 U.S.C. 154(b) by 125 days.

(21) Appl. No.: 13/373,516

(22) Filed: Nov. 17, 2011

(65) Prior Publication Data

US 2013/0125597 A1 May 23, 2013

(51) Int. Cl.
*B65D 55/14* (2006.01)

(52) U.S. Cl.
USPC ............... 70/163; 70/169; 70/173; 70/223; 70/231; 215/207; 220/210

(58) Field of Classification Search
USPC ........... 70/188, 189, 229–232, 158, 163–173, 70/175–179, 242–244, DIG. 57, 222, 223; 215/207; 220/210; 137/383–385; 411/910; 138/89, 96 R, 96 T; 285/80, 285/910
See application file for complete search history.

(56) References Cited

U.S. PATENT DOCUMENTS

| | | | | |
|---|---|---|---|---|
| 1,499,629 A | * | 7/1924 | Arnold | 220/210 |
| 1,624,840 A | * | 4/1927 | Malluk | 220/210 |
| 1,839,423 A | * | 1/1932 | Stone | 70/172 |
| 1,853,162 A | * | 4/1932 | Jacobi | 70/260 |
| 1,902,456 A | * | 3/1933 | Matthews | 220/86.2 |
| 1,944,535 A | * | 1/1934 | White | 70/159 |
| 2,345,809 A | * | 4/1944 | Greenberg | 220/86.2 |
| 2,373,470 A | * | 4/1945 | Hanke | 70/168 |
| 2,431,458 A | * | 11/1947 | Budreck et al. | 70/172 |
| 3,316,742 A | * | 5/1967 | Wellekens | 70/379 R |
| 3,426,932 A | * | 2/1969 | Rouse | 215/207 |
| 3,750,434 A | * | 8/1973 | Gerdes | 70/172 |
| 3,930,388 A | * | 1/1976 | Barras | 70/159 |
| 3,998,353 A | * | 12/1976 | Farelli | 220/210 |
| 4,013,191 A | * | 3/1977 | Gerdes | 220/203.01 |
| 4,035,921 A | * | 7/1977 | Williams | 33/728 |
| 4,317,345 A | * | 3/1982 | Hinson | 70/170 |
| 4,485,647 A | * | 12/1984 | Matthews | 70/165 |
| 4,796,768 A | * | 1/1989 | Stuckey | 215/207 |
| 4,984,698 A | * | 1/1991 | Stuckey | 215/207 |
| 5,658,036 A | * | 8/1997 | Benoist | 296/97.22 |
| 6,755,057 B2 | * | 6/2004 | Foltz | 70/159 |
| 7,797,972 B2 | * | 9/2010 | Nickeas et al. | 70/163 |
| 8,100,297 B1 | * | 1/2012 | Anish et al. | 222/153.03 |
| 2004/0154361 A1 | * | 8/2004 | Trempala et al. | 70/169 |
| 2008/0141741 A1 | * | 6/2008 | Bisaillon | 70/171 |

FOREIGN PATENT DOCUMENTS

CA 2572059 * 6/2008

* cited by examiner

*Primary Examiner* — Lloyd Gall
(74) *Attorney, Agent, or Firm* — George A. Seaby

(57) ABSTRACT

A theft prevention assembly for use on an externally threaded outer end of a fuel tank filling neck includes an outer cap, an internally threaded inner cap for mounting on the filling neck, and a lock assembly defined by a cup attached to the inner cap, a sleeve slidably in the cup and a lock in the sleeve. The outer cap is normally freely rotatable relative to the fixed inner cap, the cup and the sleeve which are releasably interconnected by the lock. When the cup is released from the sleeve, the inner cap is latched to the outer cap by the sleeve, and the two caps can be rotated as a unit to open the filling neck.

6 Claims, 5 Drawing Sheets

US 8,596,101 B2

VEHICLE FUEL THEFT PREVENTION ASSEMBLY

BACKGROUND OF INVENTION

Field of the Invention

This invention relates to a fuel theft prevention assembly and, in particular to a fuel tank lock assembly for use on a vehicle filling neck.

While the theft prevention assembly was designed specifically for use on the filling necks of truck fuel tanks, it will be appreciated by those skilled in the art that the assembly can be used for other vehicles.

As described in CA Patent Application No. 2,572,059, filed in the name of Gerard Bisaillon on Dec. 22, 2006, there is a real problem with fuel theft in the trucking industry. With the ever-increasing price of fuel, it is becoming more and more expensive to fill up a tank. A fill-up for a large truck can cost over $100 and, when vehicles are left unattended, fuel theft is becoming increasingly more common.

As well as the lock assembly described in the above-mentioned CA patent application, the patent literature discloses a large number of patents relating to lockable covers and other lock systems for vehicle fuel tanks. In this connection, reference is made to U.S. Pat. Nos. 1,499,629 (Arnold); 1,624,840 (Malluk); 1,839,423 (Stone); 1,902,456 (Matthews); 1,944,535 (White); 2,345,809 (Greenberg); 2,373,470 (Hanke), 3,930,388 (Barras); 3,998,353 (Farelli); 4,317,345 (Hinson), 5,658,036 (Benoist) and 6,755,057 (Foltz). Many of the available lock devices are accessible from outside of the fuel tank on which they are mounted. Others of the devices are somewhat complicated and/or can be used only on a fuel filling neck designed specifically for such devices.

The above-referenced Bisaillon CA Patent Application No. 2,572,059 discloses a lock assembly for use on a conventional, externally threaded fuel tank filling neck which cannot easily be tampered with even using a full set of tools. The theft prevention assembly of the present invention is believed to be an improvement over the earlier Bisaillon theft assembly. The theft prevention assembly of the present invention was designed with the understanding that the person attempting to steal fuel from a tank will be in a hurry to finish the job. With this in mind, the theft prevention assembly of the present invention includes an outer cap which is freely rotatable relative to a filling neck in the locked position. Thus, a thief would spend precious seconds turning the fuel tank cover without result. The outer cap is mounted on an internally threaded inner cap which in turn is mounted on the externally threaded, outer free end of a fuel tank filling neck. A lock assembly is used to releasably interconnect the outer and inner caps so that they rotate as a unit for removal from the fuel tank filling neck.

BRIEF DESCRIPTION OF THE DRAWINGS

A preferred embodiment of a fuel tank theft prevention assembly in accordance with the present invention is described in detail along with reference to the accompanying drawings, wherein.

DETAILED DESCRIPTION OF THE INVENTION

Figure 5:
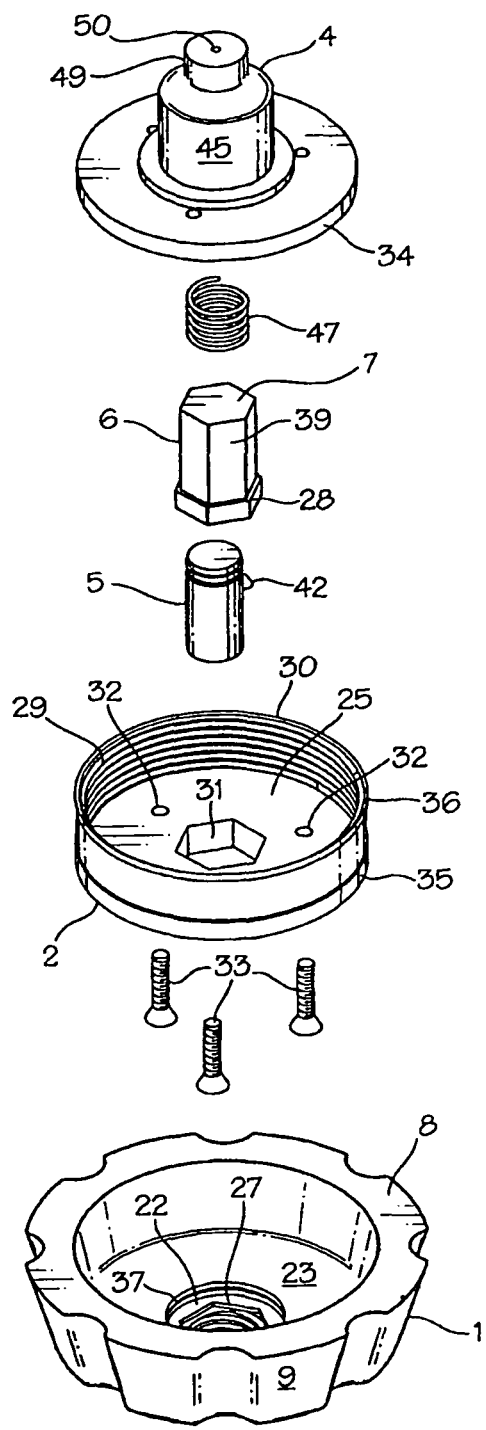
FIG. 5 is an exploded, isometric view of all but two elements of the theft prevention assembly of FIGS. 1 to 4.

Referring to the drawings, the basic elements of a theft prevention assembly in accordance with the present invention include an outer cap 1, an internally threaded inner cap 2 for mounting on the externally threaded, outer free end of a fuel tank filling neck 3 (FIG. 3), and a lock assembly defined by a cup 4 connected to and extending downwardly from the inner cap 2, a lock 5 and a hexagonal cross section sleeve 6 with a closed bottom end 7 (FIG. 5) in the cup 4.

Figure 1:
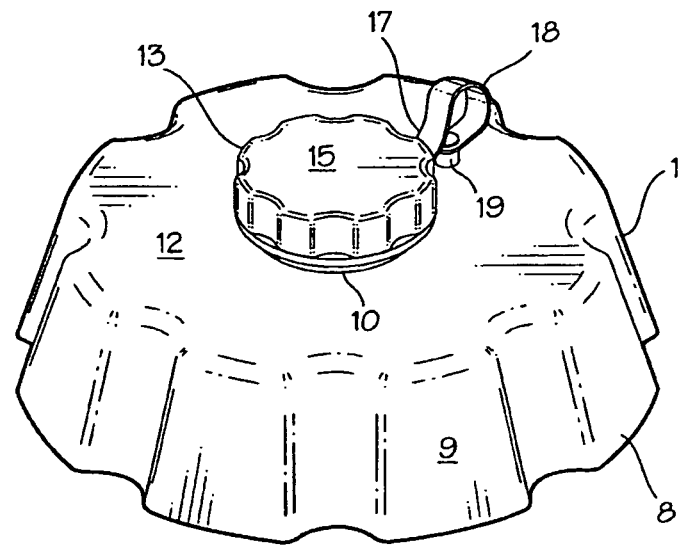
FIG. 1 is an isometric view of the fuel theft prevention assembly as seen from above.
Figure 2:
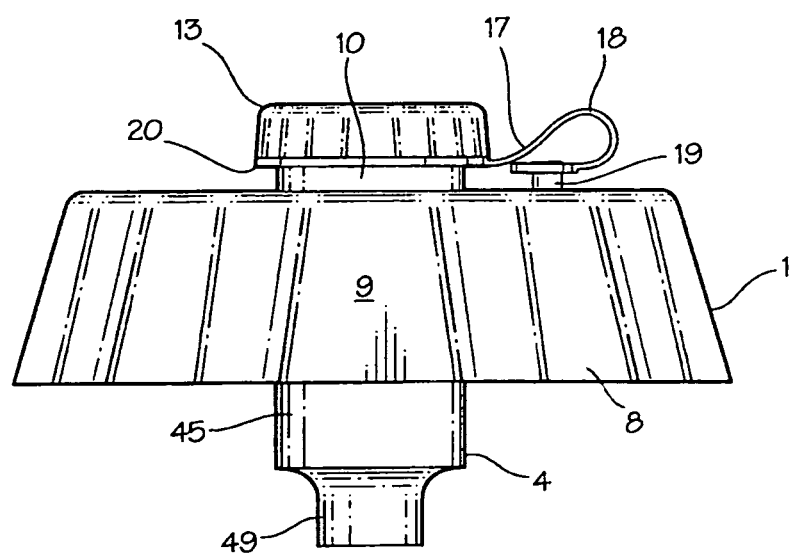
FIG. 2 is a side view of the theft prevention assembly of FIG. 1.
Figure 4:
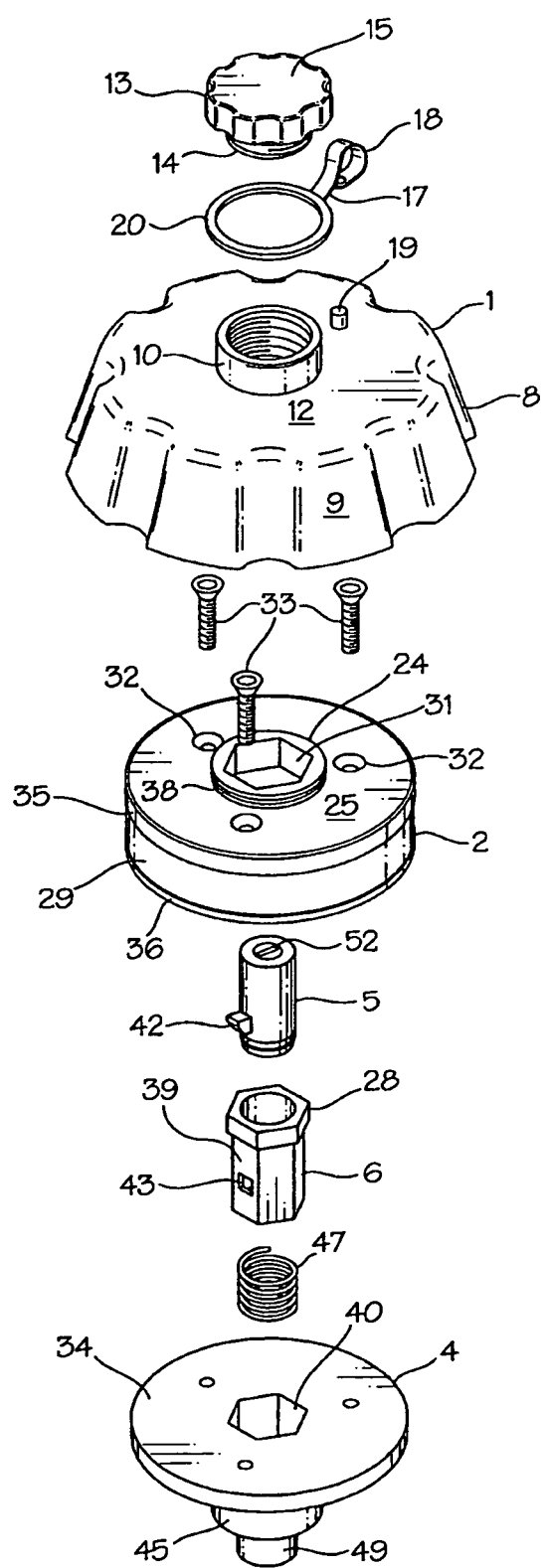
FIG. 4 is an exploded, isometric view of the theft prevention assembly of FIGS. 1 to 4 as seen from above.

The outer cap 1, which is formed of aluminum, includes a generally cylindrical side wall 8 with an upwardly tapering, scalloped outer surface 9 facilitating manual gripping and rotation on the inner cap 2. The side wall 8 is sufficiently thick that it cannot be squeezed using a large wrench or the like to enable unauthorized turning of the inner cap 2 with the outer cap. The maximum thickness of the side wall 8 is ⅝" and at its minimum thickness at the bottom of the scallops is ⅜". An internally threaded neck 10 extends upwardly from the center of the circular top wall 12 of the outer cap 1 for receiving the externally threaded neck 14 of a plastic cap 13. The top wall 12 of the cap 1 has a thickness of ¼". A disc-shaped head 15 on the cap 13 is scalloped for easy gripping and turning. The cap 13 is held on the outer cap 1 by a strap 17 with a loop 18 at its outer end connected to a pin 19 extending upwardly from the top wall 12, and a second loop 20 (FIGS. 1 and 2) at its inner end extending around the bottom end of the cap 13. An annular recess 22 (FIG. 5) in the center of the bottom 23 of the outer cap top wall 12 receives a cylindrical neck 24 (FIG. 4) on the top wall 25 of the inner cap 2. A smaller hexagonal recess 27 above the recess 22 slidably receives the hexagonal top end 28 of the sleeve 6.

The inner cap 2 includes the circular top wall 25, an internally threaded cylindrical side wall 29 and an open bottom end 30. A hexagonal passage 31 (FIGS. 4 and 5) through the neck 24 of the inner cap 2 slidably receives the top hexagonal end 28 of the sleeve 6. Holes 32 in the top wall 25 receive screws 33 for connecting the inner cap 2 to the disc-shaped top end 34 of the cup 4. Annular flanges 35 and 36 extend outwardly from the side wall 29 of the inner cap 2 to reduce friction between the side wall 29 and the side wall 8 of the outer cap 1. The cylindrical neck 24 extends upwardly from the center of the top wall 25 into the annular recess 22 in the bottom of the top wall 12 of the outer cap 1. A ring 36 (FIG. 3) in grooves 37 (FIG. 5) and 38 (FIG. 4) in the side of the outer cap recess 22 and in the neck 24 of the inner cap 2, respectively forms a liquid seal between the top ends of the outer and inner caps 1 and 2.

Figure 6:
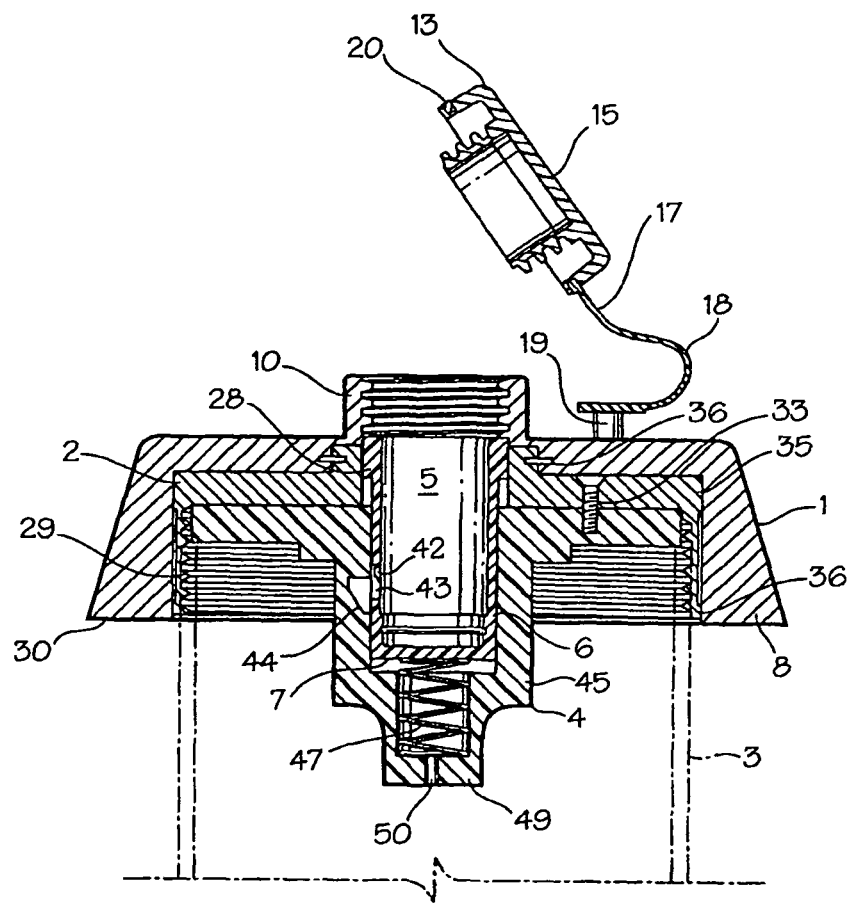
FIG. 6 is a longitudinal sectional view of the theft prevention assembly of FIGS. 1 to 5 in condition for removal from a tank filling neck.

The cylindrical lock 5 is housed in the cylindrical interior of the body 39 of the sleeve 6. As mentioned above the outer surface of the sleeve body 39 is hexagonal in cross section for sliding, but not rotating in a hexagonal well 40 (FIG. 4) in the center of the cup 4. It will be appreciated that the sleeve 6 and the passage 31 can have another polygonal cross section which permits sliding but not rotation of the sleeve in the cup well 40. A square cross section bolt 42 extends radially outwardly from the lock 5 through a hole 43 in the body 39 of the sleeve 6. In the extended position shown in solid in FIG. 3, the bolt 42 extends through the sleeve 6 into a recess 44 in the cylindrical side wall 45 of the cup well 40. In the retracted position (FIG. 6), the bolt 42 extends into the hole 43, but not into the recess 44, permitting sliding of the sleeve 6 in the cup 4.

A helical spring 47 is housed in the lower end 49 of the cup well 40. The lower end 49 of the cup 4 is smaller in diameter than the remainder of the cup. The spring 47 biases the sleeve 6 upwardly toward the outer cap 1. When the sleeve 6 moves upwardly, the larger diameter head 28 of the sleeve enters the hexagonal recess 27 in the outer cap 1. A hole 50 is provided in the bottom end of the cup 4 for equalizing pressure inside and outside of the cup.

Figure 3:
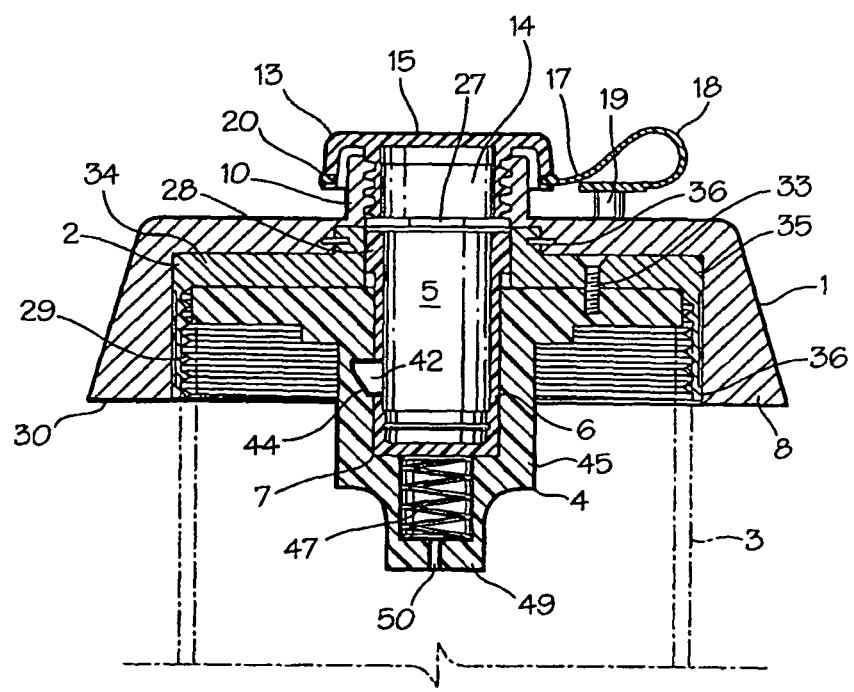
FIG. 3 is a longitudinal sectional view of the theft prevention assembly of FIGS. 1 and 2 mounted on a fuel tank filling neck.

In the locked condition of the assembly the lock bolt 42 extends through the sleeve 6 into the recess 44 in the cup 4 to retain the sleeve 6 in the lowermost position shown in FIG. 3. The locked condition of the assembly is the unlocked condition of the gas cap. With the bolt 42 in the recess 44, the sleeve 6 is retracted, i.e. the hexagonal top end 28 of the sleeve 6 is located completely within the neck 24 of the inner cap 2 latching the inner cap and the cup 4 together. The outer cap 1 is free to rotate on the inner cap 2, but rotation of the outer cap does not result in rotation of the inner cap. Thus, the assembly cannot be removed from the filling neck 3 by turning the outer cap 1.

In order to unlock the gas cap, the plastic cap 13 is released from the outer cap 1 (FIG. 6) and a key (not shown) is inserted into a slot 52 (FIG. 4) the top end of the lock 5. When the key is rotated, the bolt 42 is retracted into the sleeve 6. The spring 47 pushes the sleeve 6 upwardly so that the hexagonal head 28 extends into the hexagonal recess 27 in the bottom 23 of the top wall 12 of the outer cap 1. If the head 28 is not properly aligned with the recess 27, slight rotation of the outer cap 1 aligns the head and recess. Thus, the outer and inner caps 1 and 2 respectively, are locked together and will rotate as a unit with the cup 4 permitting removal of the assembly.

In order to again lock the theft prevention assembly in the closed position (FIG. 3) the key is inserted into the lock 5 and, using the key, the lock is pushed downwardly against the bias of the spring 47. Once the bolt 42 of the lock 5 becomes aligned with the hole 43 in the body 39 of the sleeve 6, the key is rotated to push the bolt through the hole 43 into the recess 44 in the side wall 45 of the cup 4 latching the assembly in the closed position.

The invention claimed is:

1. A fuel theft prevention assembly for use on an externally threaded vehicle filling neck comprising:
   an internally threaded inner cap for mounting on the vehicle filling neck;
   an outer cap covering and freely rotatable on said inner cap; and
   a lock assembly including a cup connected to and extending downwardly from said inner cap; and a lock slidable in said cap accessible through a top end of said outer cap for movement between a locked position in which the inner cap and cup are locked together and the outer cap is freely rotatable relative to the inner cap, and a release position in which the outer and inner caps and the cup are locked together, whereby rotation of said outer cap results in corresponding rotation of said inner cap and said cup, permitting removal and re-attachment of the theft prevention assembly to the filling neck.

2. The theft prevention assembly of claim 1, wherein said outer cap includes a top wall, and a thick side wall sufficiently thick to prevent squeezing of the outer cap against the inner cap to enable unauthorized opening of the theft prevention assembly.

3. The theft prevention assembly of claim 2, wherein the cup includes a disc-shaped top end and a cylindrical side wall extending downwardly from said top end.

4. The theft prevention assembly of claim 2, wherein said side wall of the outer cap has a scalloped outer surface, facilitating gripping of the outer cap, said outer cap side wall having a maximum thickness of ⅝" and minimum thickness at bottom's of the scallops of ⅜".

5. The theft prevention assembly of claim 1, wherein said lock assembly includes a polygonal well in said cup; a polygonal sleeve with a closed bottom end slidable in said well; a polygonal opening in a top end of said inner cap for receiving a polygonal top end of said sleeve; and a polygonal recess in a bottom surface of said outer cap for receiving the polygonal top end of the sleeve.

6. The theft prevention assembly of claim 5, wherein said lock assembly includes a bolt in one side of said lock slidable in a hole in said sleeve; and a recess in said cup on one side of the well for receiving the bolt to prevent or permit movement of the lock from the locked to the release position.

\* \* \* \* \*